(12) United States Patent
Morosin et al.

(10) Patent No.: US 7,353,777 B2
(45) Date of Patent: Apr. 8, 2008

(54) SELF-CLEANABLE HAIR BRUSH

(76) Inventors: Michael Keith Morosin, 630 Quintana Rd., PMB-321 Morro Bay, CA (US) 93442; Rose Chan Morosin, 630 Quintana Rd., PMB-321 Morro Bay, CA (US) 93442; David K. Helfenstein, 144 Carlisle Ct., Benicia, CA (US) 94510

( * ) Notice: Subject to any disclaimer, the term of this patent is extended or adjusted under 35 U.S.C. 154(b) by 792 days.

(21) Appl. No.: 10/846,942

(22) Filed: May 14, 2004

(65) Prior Publication Data

US 2006/0000423 A1 Jan. 5, 2006

(51) Int. Cl.
*A01K 13/00* (2006.01)
(52) U.S. Cl. .................. 119/612; 119/615; 119/664
(58) Field of Classification Search .............. 119/600, 119/611, 612, 613, 614, 615, 664, 625, 628, 119/629; 15/169, 246, 184, 185, 160; D4/136, D4/121
See application file for complete search history.

(56) References Cited

U.S. PATENT DOCUMENTS

| | | | |
|---|---|---|---|
| 2,781,739 A * | 2/1957 | Dick et al. | 119/632 |
| 3,421,171 A * | 1/1969 | Tsuruzawa | 15/172 |
| 3,577,580 A | 5/1971 | Rand | |
| 3,886,617 A | 6/1975 | Labran et al. | |
| 4,517,703 A | 5/1985 | Koke | |
| 5,600,865 A | 2/1997 | Morrison | |
| D384,058 S | 9/1997 | Pinon | |
| 5,862,563 A * | 1/1999 | Hartmann | 15/169 |
| D411,048 S | 6/1999 | Pinon | |
| 6,021,542 A | 2/2000 | Norman | |
| 6,112,362 A | 9/2000 | Parko et al. | |
| 6,421,872 B1 | 7/2002 | Sciandivasci | |
| 6,427,633 B1 | 8/2002 | Ogden | |

* cited by examiner

*Primary Examiner*—T. Nguyen
(74) *Attorney, Agent, or Firm*—Knobbe Martens Olson & Bear LLP

(57) ABSTRACT

A self-cleanable hairbrush for use on animals or humans is described that has a frame with strands stretched across it. In one embodiment, the frame is attached to the brush by a pivoting hinge and may be pivoted by the hinge to a position in which the frame is seated flat against a bristle-side of the brush, allowing the strands to slip between the bristles and the frame to be secured in place. As the brush is used, loose hairs, fur, or other debris may become entangled in the bristles. Releasing the frame and allowing it to swing up through the bristles gathers the entangled debris and removes it from bristles, allowing it to be disposed of. The frame and strands may then be re-seated against the bristle-side of the brush, leaving the brush cleaned and ready for re-use.

19 Claims, 4 Drawing Sheets

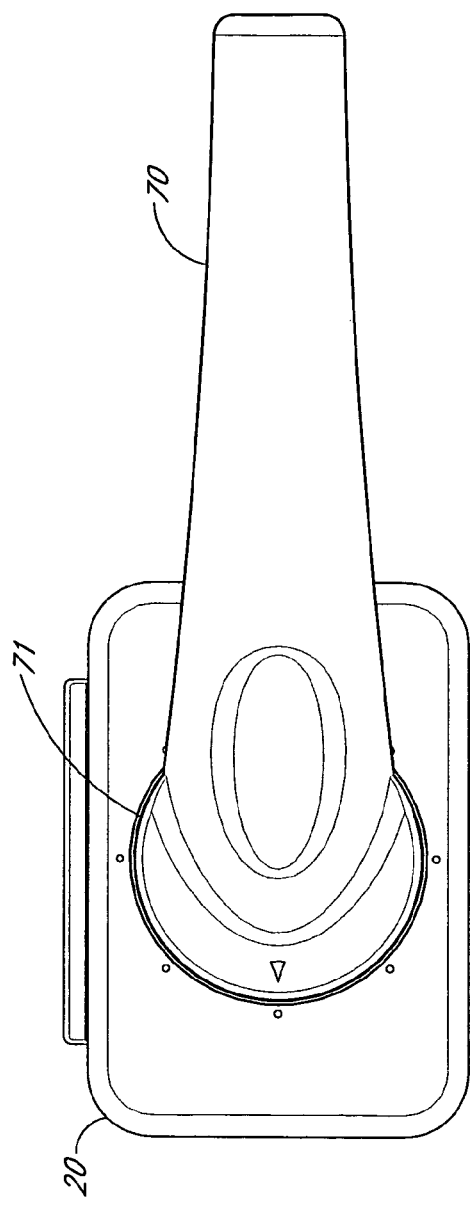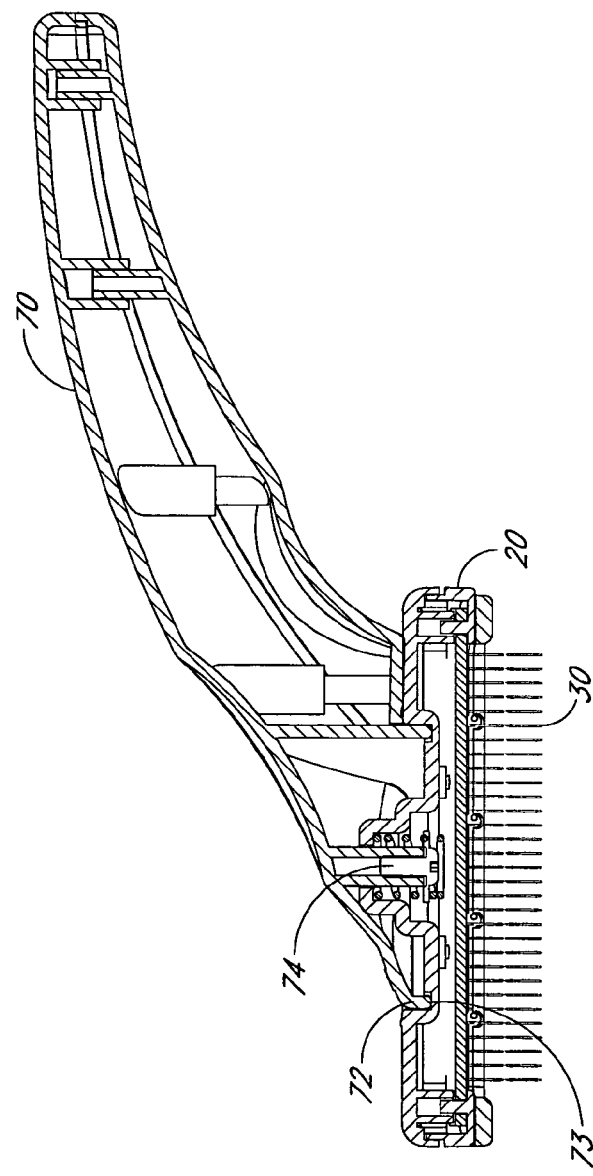
FIG. 4A
FIG. 4B

SELF-CLEANABLE HAIR BRUSH

FIELD OF THE INVENTION

The invention relates to hair and grooming brushes, and, more particularly to self-cleanable brushes.

BACKGROUND OF THE INVENTION

Brushes of various types, such as hair brushes and pet grooming brushes, suffer from the problem of becoming clogged with loose hairs, fur, and other debris that may become entangled amongst the bristles of the brush while the brush is being used.

Users may try to remove the hair by using a comb or another brush, if one is available, or by hand. However, these methods are often time-consuming and inconvenient, sometimes even exposing the user to a risk of injury by sharp bristles, in part because hair and fur may easily become entangled amongst the bristles. Thus, it can be difficult to remove the debris in essentially one manipulative motion, which can be desirable, especially when grooming a pet who is trying to escape confinement.

Self-cleanable brushes that include a perforated plate with holes that can slide over the bristles of a brush may be limited to brushes with bristles configured to emerge from a backing member perpendicularly to the backing member, among other limitations. Such self-cleanable brushes may thus not be suitable for pet grooming brushes that frequently include bristles extending from a backing member at an angle. Such self-cleanable brushes may also become difficult or impossible to use when bristles become bent or are no longer in their original perfect alignment, as can be caused by the wear-and-tear of normal brush use.

Furthermore, self-cleanable brushes that include removable and/or disposable parts are not usable when the removable parts are misplaced or replacements for disposable parts are not readily available.

SUMMARY OF THE INVENTION

The present invention addresses the foregoing problems by providing a self-cleanable hairbrush for use on animals or humans that has a frame with strands extending across it, allowing for easy removal of fur, hair, and other debris while remaining tolerant of non-perpendicular bristles and other deviations and imperfections in the bristles that may arise from the wear-and-tear of normal use. In one embodiment, the frame is attached to the brush by a pivoting hinge and may be pivoted by the hinge to a position in which the frame is seated flat against a bristle-side of the brush, allowing the strands to slip between the bristles and the frame to be secured in place. In other embodiments, the frame is formed as an integral part of the brush or brush handle. In some embodiments, the strands and frame are formed as an integral unit.

As the brush is used, loose hairs, fur, or other debris may become entangled in the bristles. Releasing the frame and allowing it to swing up through the bristles gathers the entangled debris and removes it from bristles, allowing it to be disposed of. The frame and strands may then be re-seated against the bristle-side of the brush, leaving the brush cleaned and ready for re-use.

In various embodiments, the strands may be configured in a variety of patterns to fit easily between the bristles of the brush. For example, the strands may be configured as parallel lines, as a grid of perpendicular strands, as a set of diagonal lines, or in another suitable configuration. The strands may be formed of wire, plastic, or other material that allows the strands to slip easily between the bristles and to support the collect debris without breaking.

Embodiments of the self-cleanable brush further include a handle that is rotatable to various positions within a full circle and that may thus allow the user to find a position that reduces hand strain and that allows for a more comfortable and efficient use of the brush.

An embodiment of a brush is described that comprises a brushing element, a cleaning element, and a pivoting hinge. The brushing element includes a bristle head and a multiplicity of bristles extending from the bristle head. The cleaning element includes a frame and strands extending across the frame. The pivoting hinge mounts the frame to the bristle head, allowing the frame to swing across the bristles when the brush is being used and to swing away from the bristles when the brush is being cleaned, such that when the frame swings across the bristles, the frame lies substantially flat against the bristle head and the strands lie between the bristles. When the frame swings away from the bristles, the strands carry away any debris that may have collected amongst the bristles during use of the brush.

An embodiment of a method of cleaning a hair brush is described. The method comprises the acts of: providing a hair brush that has a bristle head and a releaseably attached strand frame attached by a hinge to the bristle head; and allowing the strand frame to pivot about the hinge, lifting up out of the bristles debris from the bristle head that has collected on the strand frame.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages taught or suggested herein.

BRIEF DESCRIPTION OF THE DRAWINGS

These and other features of the invention will now be described with reference to the drawings summarized below. These drawings and the associated description are provided to illustrate preferred embodiments of the inventions, and not to limit the scope of the invention. Like reference characters designate the same or similar parts throughout the several views.

FIG. 4A is a top-view of one embodiment of the self-cleanable brush.

FIG. 4B is a cross-section view of one embodiment of the self-cleanable brush showing a rotating mechanism for rotating the handle of the brush.

DETAILED DESCRIPTION OF THE PREFERRED EMBODIMENT

A self-cleanable brush is disclosed that allows a user to easily remove hair, fur, or other debris that may have collected amongst the bristles of the brush during use. Embodiments of the brush may be used as hair brushes, pet grooming brushes, or other types of brushes.

The self-cleanable brush will now be disclosed with reference to the accompanying figures in which like numerals refer to like parts.

Figure 1B:
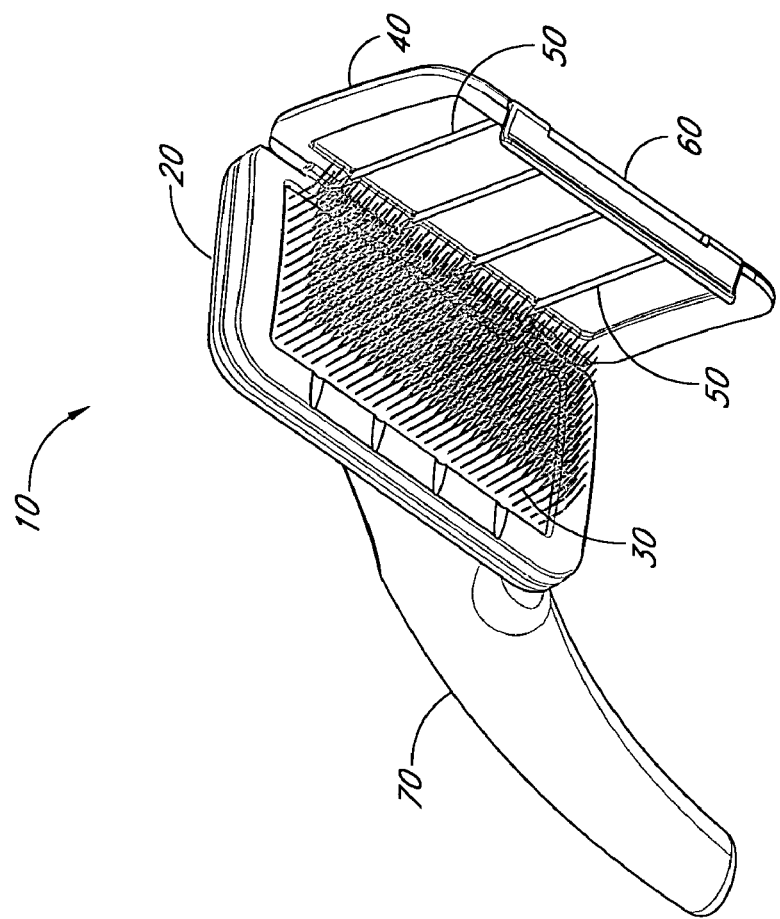
FIG. 1B shows a view from below of one embodiment of the self-cleanable brush with the cleaning frame opened.
Figure 1A:
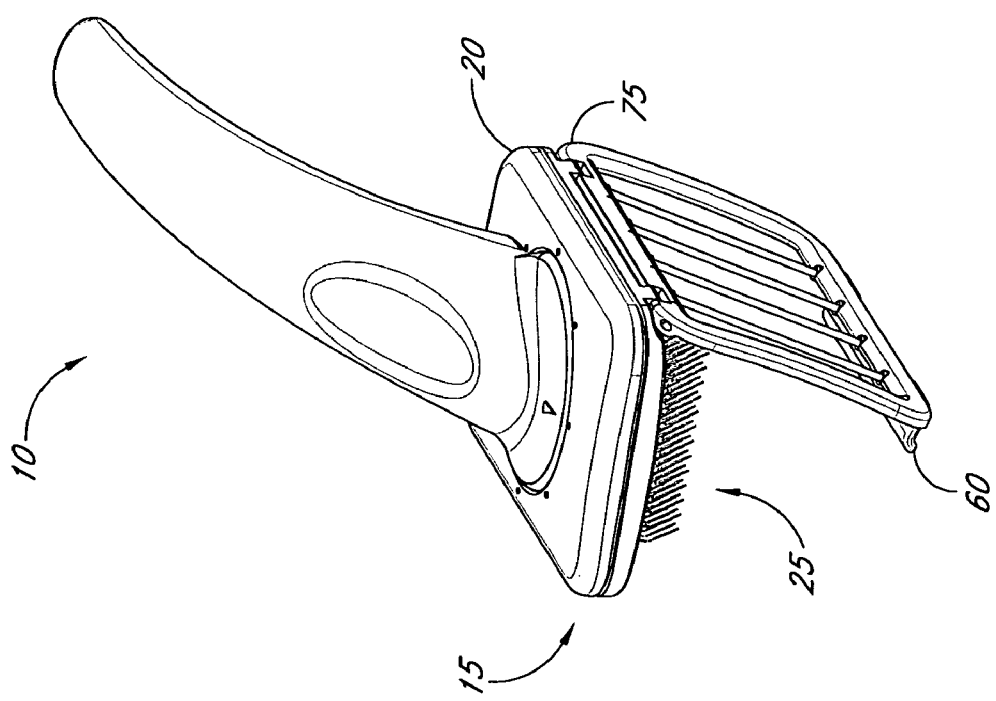
FIG. 1A shows a front view of one embodiment of a self-cleanable brush with a cleaning frame opened.

FIGS. 1A and 1B show two views of one embodiment of a self-cleanable brush 10. FIG. 1A shows a front view of the brush 10, and FIG. 1B shows a view of the brush 10 from below. The embodiment of the self-cleanable brush 10 depicted in FIGS. 1A and 1B comprises a bristle head 20, bristles 30, a handle 70, and a cleaning frame 40.

The bristle head 20 shown in FIG. 1 is of a generally rectangular shape. In other embodiments, the bristle head 20 may be of another shape. For example, the bristle head 20 may be generally oval-shaped, square, or round. For some embodiments in which a user grasps the bristle head 20 manually during brushing, the bristle head 20 may be kidney-bean-shaped or other shape that ergonomically fits a user's hand and is comfortable to hold.

The bristle head 20 may be made of metal, plastic, rubber or other suitable material, such as wood or molded synthetic resin.

As illustrated in FIG. 1A, the bristle head 20 has a bristle-side 25 and a back-side 15. The bristle-side 25 has a plurality of bristles 30 extending therefrom, the bristles 30 generally parallel to one another. The bristles 30 are embedded at one end and extend perpendicularly from the bristle head 20. In other embodiments, the bristles may extend from the bristle head 20 at an angle. The bristles 30 may be made of metal, plastic, rubber, or other suitable material. In some embodiments, particularly those used for pet grooming, the bristles may be densely packed wire bristles of metal or other similarly strong material.

In the embodiment of the self-cleanable brush 10 shown in FIGS. 1A and 1B, the handle 70 that a user grasps to manipulate and control the brush 10 is attached to the back-side 15 of the bristle head 20. In other embodiments, the handle 70 may be attached to the bristle head 20 along an edge of the bristle-head 20 or in another position that allows a user grasping the handle 70 to manipulate the brush 10. In still other embodiments, the brush 10 does not have a handle 70, and the user grasps the bristle head 20 from the back-side 15 directly when using the brush 10. In some embodiments, the handle 70 is rotatably attached to the bristle head 20, as will be described in greater detail with reference to FIG. 3.

The cleaning frame 40 of the self-cleanable brush 10 as depicted in FIGS. 1A and 1B is of substantially the same perimeter shape as the bristle head 20 and may be made of plastic, metal, or other suitable material. The cleaning frame 40 is attached to the bristle head 20 along one side of the bristle head 20 by one or more pivoting hinges 75 or other pivoting mechanism. The pivoting hinges 75 allow the cleaning frame to swing away from the bristle-side 25 of the bristle head 20, as is depicted in FIGS. 1A and 1B. The pivoting hinges 75 also allow the cleaning frame 40 to swing up against the bristle-side 25 of the bristle head 20. A latching mechanism 60 on the cleaning frame 40, generally opposite the pivoting hinges 75, is configured to engage with the bristle head 20 to align and releaseably attach the cleaning frame 40 to the bristle head 20. In one embodiment, there is a ridge on the surface of the bristle head 20 for releaseably engaging the latching mechanism 60.

The cleaning frame 40 includes strands 50 extending across it that may be configured in any one of a variety of configurations. In several preferred embodiments, the strands are generally parallel to one another. In various embodiments, the strands 50 may be stretched across the cleaning frame 40 from side to side relative to the frame 40 or in a lengthwise direction relative to the frame 40. In some embodiments, some strands 50 may be stretched across the cleaning frame 40 in a side to side direction and some strands 50 are stretched across the cleaning frame 40 in a lengthwise direction, thereby forming a crossing matrix or grid of strands 50 stretching across the cleaning frame 40. In other embodiments, the strands 50 may extend diagonally with reference to the cleaning frame 40 or may be configured in another configuration that corresponds to a configuration of the bristles 30.

When the cleaning frame 40 is attached to the bristle head 20, the strands 50 on the cleaning frame 40 easily slip between the bristles 30 to sit substantially against the bristle head 20 at the base of the bristles 30, allowing the bristles 30 to extend normally from the bristle head 20. The strands 50 may be spaced so as to allow many bristles 30 to extend between adjacent strands 50, thereby allowing the allowing the cleaning frame 40 and the strands 50 to tolerate deviations in the bristles 30, such as bristles 30 that are somewhat bent or misshapen due to wear-and tear of brush use. The brush 10 may then be used in a normal fashion, for example, to groom a pet or to brush hair.

When the bristles 30 of the brush 10 become clogged with matted fur, hair, or other debris, the latching mechanism 60 of the cleaning frame 40 may be disengaged from the bristle head 20, allowing the cleaning frame 40 to swing away from the bristle head 20. As the cleaning frame 40 swings away from the bristle head 20, the strands 50 of the cleaning frame 40 are drawn up through the bristles 30, bringing the fur, hair, or debris up with it past the bristles 30, where the fur, hair, or debris collected on the strands 50 may be removed and disposed of. The cleaning frame 40 may then be replaced and the latching mechanism 60 re-engaged, leaving the brush 10 clean and ready for re-use.

In one embodiment, the handle 70 is split down its length into two sections that are joined at the end of the handle by the pivoting hinge 75. A first section of the handle 70 may be connected to the bristle head 20 may be integral to the bristle head 20, and a second section of the handle 70 may be connected to the cleaning frame 40 or may be integral to the cleaning frame. The pivoting hinge 75 may be closed so that the two sections join to form a single handle 70 during use and may be opened to separate the cleaning frame 40 from the bristle head 20 for cleaning.

Figure 2:
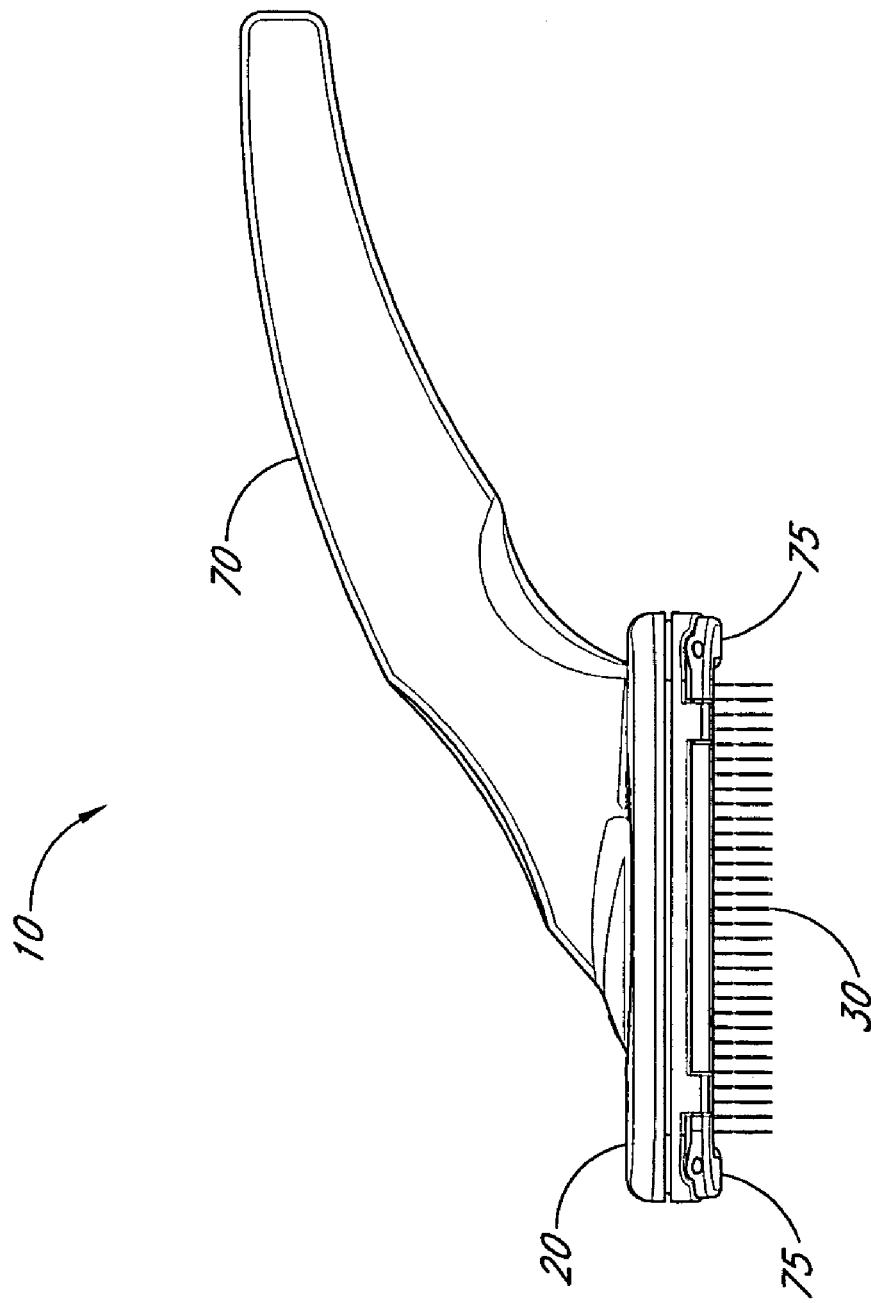
FIG. 2 shows a side view of one embodiment of a self-cleanable brush with the cleaning frame closed.

FIG. 2 shows a side view of one embodiment of a self-cleanable brush 10 with the cleaning frame 40 closed.

Figure 3:
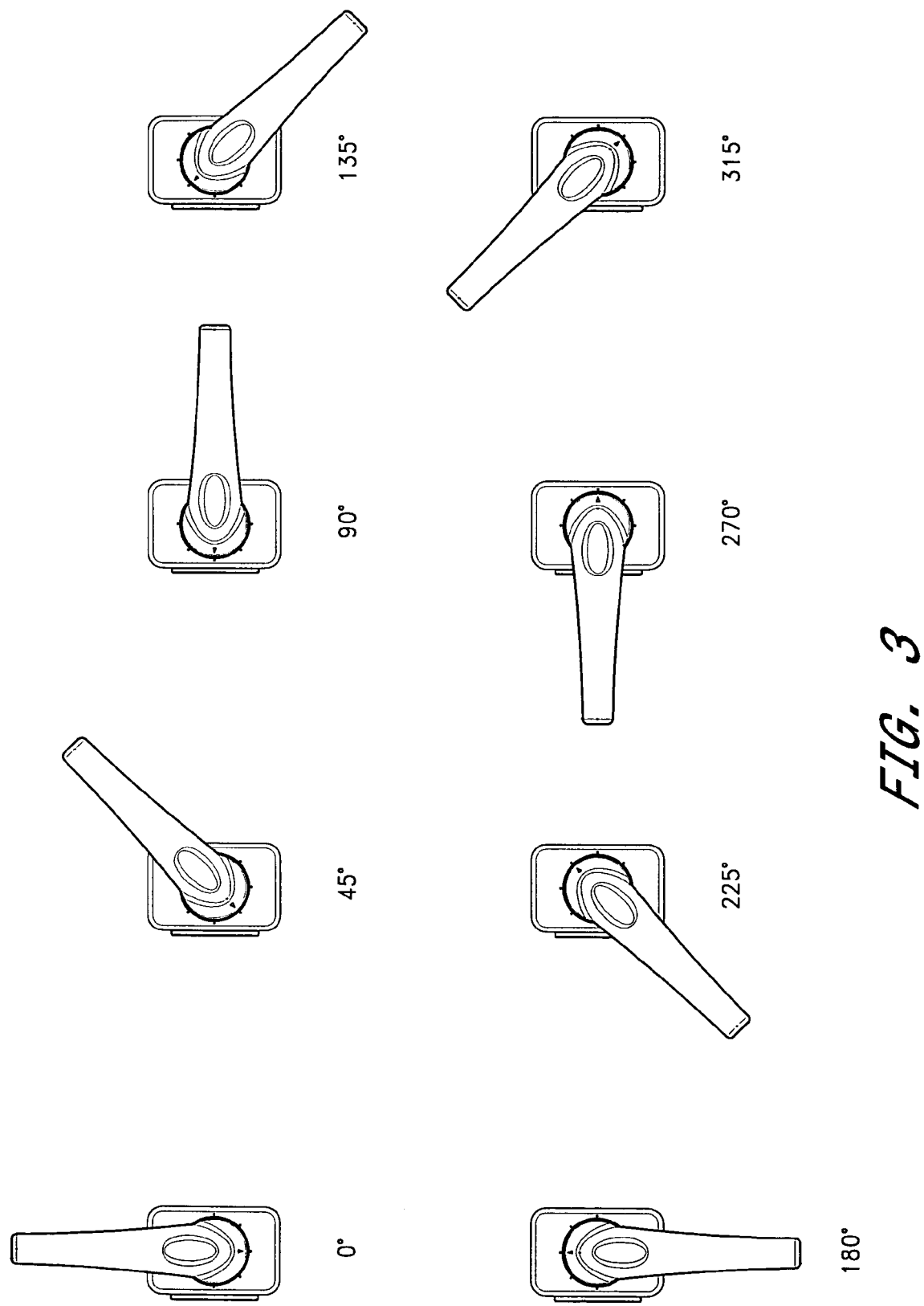
FIG. 3 shows top views of one embodiment of the self-cleanable brush with a rotatable handle positioned in a variety of positions.

FIG. 3 shows top views of one embodiment of the self-cleanable brush 10 with a rotatable handle 70 positioned in a variety of positions. In some embodiments, it may be desirable to adjust the position of the handle 70 relative to the bristle head 20. For example, when using the brush 10 to groom a pet with thick fur, the fur may cause resistance, thus increasing strain and fatigue of the hand, arm, and/or wrist of the person using the brush 10. Changing the position of the handle 70 may allow the user to find an orientation which reduces the strain. Furthermore, the three-dimensional and non-uniform nature of an animal's body surfaces which a user may desire to groom present additional challenges that may be alleviated by adjusting the position of the brush handle 70 relative to the bristle head 20 and the bristles 30.

The embodiment depicted in FIG. 3 provides for eight different handle positions relative to the bristle head 20 that together allow the handle 70 to circumscribe an arc of three-hundred-and-sixty degrees in intervals of forty-five degrees.

In other embodiments, the handle 70 may be positionable in a different set of positions, or may be positionable at any point in a three-hundred-sixty-degree arc. Furthermore, in still other embodiments, the handle 70 of the brush 10 may be non-rotating and may be attached to the bristle head 20 in a fixed manner or may be an integral part thereof.

FIG. 4A is a top-view of one embodiment of the self-cleanable brush 10, and FIG. 4B shows a cross-section view of one embodiment of the self-cleanable brush 10 showing a rotating mechanism for rotating the handle 70 of the brush 10. As illustrated in FIGS. 4A and 4B, the handle has a circular base 71 with a circular lip 72 that extends downwards and that may be seated in a circular channel 73 formed in the back-side 25 of the bristle head 20. The handle 70 is held in place by a spring lock screw 74. In the floor of the circular channel 73 may be recesses, and in the bottom of the circular lip may be one or more protrusions that can fit into the recesses to form detents for holding the handle 70 in a given position relative to the bristle head 20. For example, in the embodiment depicted in FIG. 3, eight recesses may be spaced evenly in the floor of the circular channel 73 to form detents that are forty-five degrees apart around the circle. By applying pressure to the handle 70, the user may force the protrusion out of the recess to allow for rotation of the handle 70.

Still other embodiments of the self-cleanable brush 10 do not include a handle 70. Instead, a user may grasp the bristle head 20 directly when using the brush 10. In some of these embodiments, a strap or elastic band may be attached across the back-side 15 of the bristle head 20 and the user may slip a hand under the strap or elastic band for added gripping security while using the brush 10.

It will be understood that each of the elements described above, or two or more together, may also find a useful application in other types of constructions differing from the types described above.

While the invention has been illustrated and described as embodied in a self-cleanable brush, however, it is not limited to the details shown, since substitutions and changes in the forms and details of the device illustrated and its operation can be made by those skilled in the art without departing in any way from the spirit of the present invention. Accordingly, the scope of the present invention is intended to be defined only by reference to the appended claims.

What is claimed is:

1. A brush comprising:
   a brushing element that includes a bristle head and a multiplicity of bristles extending from said bristle head; and
   a cleaning element that includes a frame and strands extending across said frame;
   a pivoting hinge that mounts said frame to said bristle head, allowing said frame to swing across said bristles when said brush is being used and to swing away from said bristles when said brush is being cleaned, such that when said frame swings across said bristles, said frame lies substantially flat against said bristle head and said strands lie between said bristles, and when said frame swings away from said bristles, said strands carry away any debris that may have collected amongst said bristles during use of said brush.

2. The brush of claim 1, wherein said brush is a pet grooming brush.

3. The brush of claim 1, wherein said brush is a hair brush for use on humans.

4. The brush of claim 1, wherein said bristles extend from said bristle head parallel to one another.

5. The brush of claim 1, wherein said bristles extend from said bristle head at an angle.

6. The brush of claim 1, wherein said strands are wires made of metal.

7. The brush of claim 1, wherein said strands are filaments made of plastic.

8. The brush of claim 1, wherein said strands and said frame are an integral unit.

9. The brush of claim 1, further comprising a latching mechanism configured to releaseably attach said bristle head and said cleaning element.

10. The brush of claim 1, wherein said strands are parallel to one another.

11. The brush of claim 1, wherein at least two of said strands are parallel to one another.

12. The brush of claim 1, wherein at least two of said strands are perpendicular to one another.

13. The brush of claim 1, further comprising a handle.

14. The brush of claim 13, wherein said handle is connected to said bristle head.

15. The brush of claim 14 wherein said handle is further configured to rotate relative to said bristle head.

16. The brush of claim 15, wherein said handle is configured to rotate up to 360 degrees relative to a starting position.

17. A method of cleaning a hairbrush, said method comprising:
   providing a hair brush that has a bristle head with bristles extending therefrom and a releaseably attached strand frame with strands extending across said strand frame, wherein said strand frame is attached by a hinge to said bristle head; and
   allowing said strand frame to pivot about said hinge, lifting up out of said bristles debris from said bristle head that has collected on said strands.

18. The method of claim 17, further comprising disengaging a fastening mechanism on said strand frame from an associated mechanism on said bristle head.

19. The method of claim 18, further comprising:
   removing and disposing of said debris from said strands; and
   re-engaging said fastening mechanism on said strand frame to said associated mechanism on said bristle head.

* * * * *